United States Patent
Hu

(10) Patent No.: US 8,400,676 B2
(45) Date of Patent: Mar. 19, 2013

(54) IN PLACE LINE SPLITTING PROCESS AND METHOD FOR MULTIPLE BEAM PRINTERS

(75) Inventor: Hao Hu, Belmont, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 711 days.

(21) Appl. No.: 12/570,231

(22) Filed: Sep. 30, 2009

(65) Prior Publication Data

US 2011/0075160 A1    Mar. 31, 2011

(51) Int. Cl.
*G06F 15/00* (2006.01)
*G06K 1/00* (2006.01)
*H04N 1/60* (2006.01)

(52) U.S. Cl. ....... 358/1.9; 358/1.16; 358/1.17; 358/1.15

(58) Field of Classification Search .................. None
See application file for complete search history.

(56) References Cited

U.S. PATENT DOCUMENTS

| | | | | |
|---|---|---|---|---|
| 5,515,097 A | * | 5/1996 | Munechika et al. | 347/241 |
| 5,956,056 A | * | 9/1999 | Kaneko et al. | 347/43 |
| 6,456,390 B1 | * | 9/2002 | Okubo et al. | 358/1.17 |
| 2003/0193697 A1 | * | 10/2003 | Kurosawa et al. | 358/468 |
| 2003/0210422 A1 | * | 11/2003 | Grohs et al. | 358/1.15 |
| 2008/0150225 A1 | * | 6/2008 | Mukaiyama | 271/264 |

* cited by examiner

*Primary Examiner* — Ming Hon
(74) *Attorney, Agent, or Firm* — Buchanan Ingersoll & Rooney P.C.

(57) ABSTRACT

A method of rasterizing a print image plane for a multiple beam printer engine, which comprises the steps of receiving an image having a plurality of lines of print data for processing by the printer engine, and performing a print image plane rasterization. The print image plane rasterization includes (a) calculating a first line destination for a first line of print data; (b) moving the first line of print data to the first line destination; and (c) calculating a displaced line destination for a displaced line of print data, and continually moving the displaced line of print data to the displaced line destination until the displaced line of print data is moved to the first line and forms a loop. The process is repeated until each line of the plurality of lines has been moved to a line destination associated with each line of the image.

20 Claims, 8 Drawing Sheets

6 Lines Case
00 → 00 (No Operation)
Loop Detected. Starting from next pending line: 1
01 → 03
03 → 04
04 → 02
02 → 01
Loop Detected. Starting from next pending line: 5
05 → 05 (No Operation)

7 Lines Case
00 → 00 (No Operation)
Loop Detected. Starting from next pending line: 1
01 → 04
04 → 02
02 → 01
Loop Detected. Starting from next pending line: 3
03 → 05
05 → 06
06 → 03

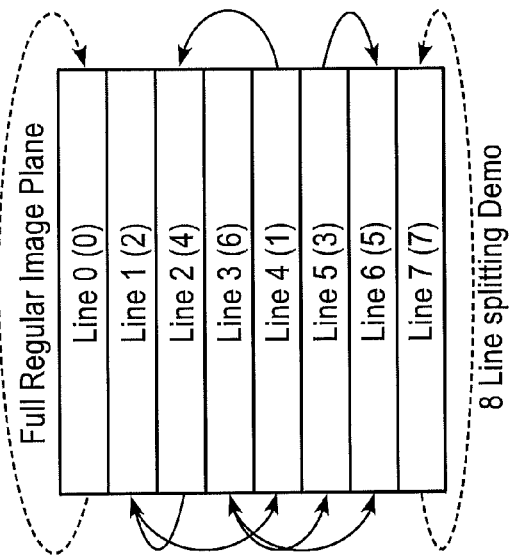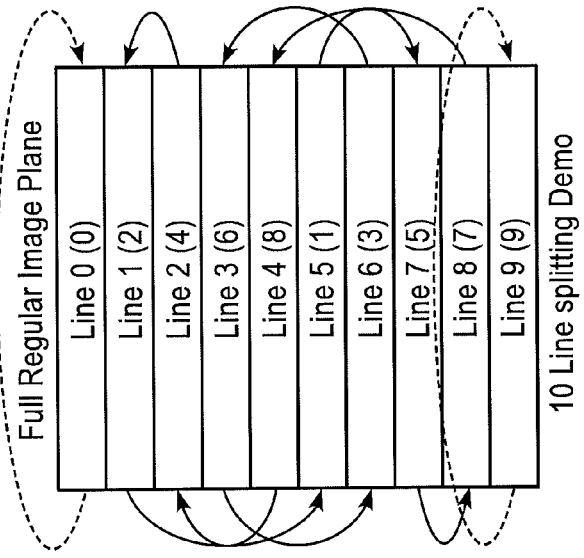
FIG. 3C
FIG. 3D

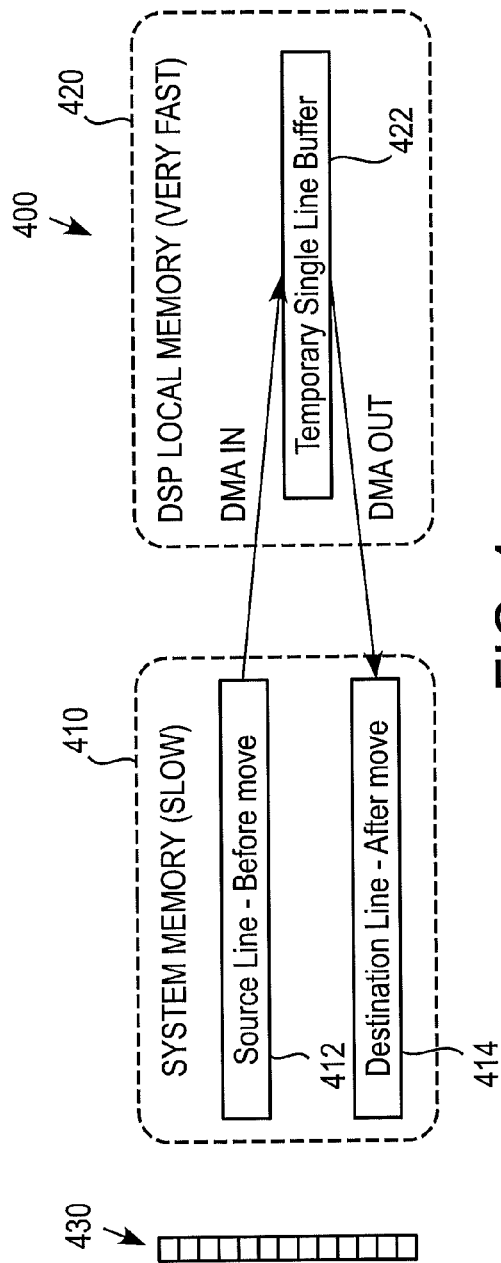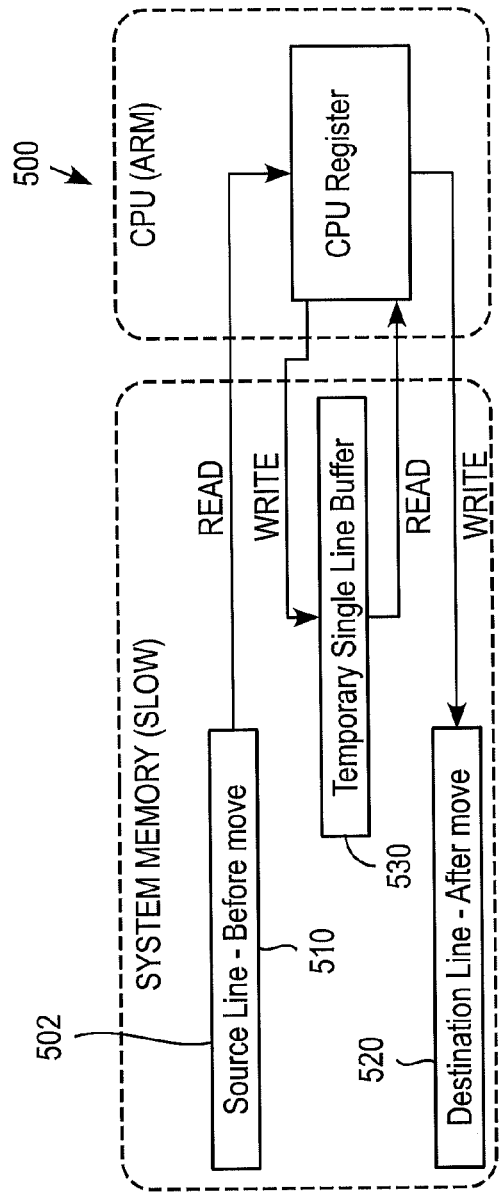

Algorithm Pseudo Code
Assume we have *totalLineCount* lines in the original image buffer and the index of first line is 0, the algorithm can be described as following pseudo code:

SET all elements of lineMovedFlag [totalLineCount] to FALSE   // Mark NO lines are moved yet
SET oddLineOffSet to 0                                         // Odd lines will be stored from beginning
SET evenLineOffSet to (totalLineCount + 1) / 2                 // Even Lines will be: stored from middle
SET next NeedMoveLine to 0                                     // Start with the first: line
SET fromLine to nextNeedMoveLine                               // Set current handling line
SET leftMoveCount to totalLineCount                            // Total move count should equals to line count WHILE leftMoveCount > 0
    DO
        IF fromLine is odd line THEN              // Find the toLine for the current fromLine
            SET toLine = oddLineOffSet + fromLine / 2
        ELSE
            SET toLine = evenLineOffSet + fromLine / 2
        END IF IF toLine equals to fromLine THEN         // In this case, the move is virtually done
            SET lineMovedFlag [fromLine] to TRUE    // Mark this fromLine as moved
            SET leftMoveCount to (leftMoveCount -1)  // Done with one move
        END IF IF lineMovedFlag [fromLine] equals to FALSE THEN
            If lineMovedFlag [toLine] equals to FALSE THEN  // No need to saved moved line
                DMA toLine Content from RAM into DSP Local Memory    // Save destination line
            END IF // Move the current fromLine content in DSP to the destination toLine location
            DMA fromLine Content (in DSP Local Memory already) to toLine location in RAM
            SET lineMovedFlag[fromLine] to TRUE     // Mark this fromLine as moved
            SET fromLine to toLine                  // Current toLine will be next fromLine
            SET left MoveCount to (leftMoveCount - 1)   // Done with one move
        ELSE IF leftMoveCount > 0 THEN
            // A loop is detected. Find the next line that need to be moved
            SET nextNeedMoveLine to Next line which lineMovedFlag [nextNeedMoveLine] is FALSE
            SET fromLine to nextNeedMoveLine        // Set Current fromLine
            DMA fromLine Content from RAM into DSP Local Memory
        END IF
END WHILE LOOP

FIG. 6

Algorithm Pseudo Code
Assume we have *totalLineCount* lines in the original image buffer and the index of first line is 0, the algorithm can be described as following pseudo code:

SET all elements of lineMovedFlag [totalLineCount] to FALSE  // Mark NO lines are moved yet
SET oddLineOffSet to 0  // Odd lines will be stored from beginning
SET evenLineOffSet to (totalLineCount + 1) / 2  // Even Lines will be stored from middle
SET next NeedMoveLine to 0  // Start with the first line
SET historyCnt to 0  // Start with no move history
SET fromLine to nextNeedMoveLine  // Set current handling line
SET leftMoveCount to totalLineCount  // Total move count should equals to line count
SET playBackFlag to FALSE

```
WHILE leftMoveCount > 0
    DO
        IF fromLine is odd line THEN           // Find the toLine for the current fromLine
            SET toLine = oddLineOffSet + fromLine / 2
        ELSE
            SET toLine = evenLineOffSet + fromLine / 2
        END IF IF toLine equals to fromLine THEN              //  In this case, the move is virtually done
            SET lineMovedFlag [fromLine] to TRUE    // Mark this fromLine as moved
            SET leftMoveCount to (leftMoveCount -1)         // Done with one move
        END IF IF lineMovedFlag [fromLine] equals to FALSE THEN
                SET mvHistory [historyCnt] fromLine   = fromLine    // Save fromLine into mvHistory
                SET mvHistory [historyCnt]  toLine= toLine           //Save toLine into mvHistory
                SET historyCnt to (historyCnt + 1)
                // increase history count
                SET lineMovedFlag [fromLine] to TRUE      // Mark this fromLine as moved
                SET fromLine to toLine                            //  Current toLine will be next fromLine
                SET left MoveCount to (leftMoveCount - 1)   // Done with one move
```

FIG. 7A

```
            If leftMoveCount equals 0 THEN SET playBackFlag to TRUE
            ELSE IF leftMoveCount > 0 THEN
                    // A loop is detected. Find the next line that need to be moved
                    SET nextNeedMoveLine to Next line which lineMovedFlag [nextNeedMoveLine] is FALSE
                    SET fromLine to nextNeedMoveLine       // Set current fromLine
                    SET playBackFlag to TRUE               // Loop detected. Playback move history
            END IF IF playBackFlag equals TRUE THEN
                    BACKUP mvHistory [0] .fromLine TO a temporary line buffer   // Backup first line
                    WHILE historyCnt > 0                   // Playback moves history in reverse order
                    DO  SET historyCnt to (historyCnt - 1)
                        IF historyCnt equals 0 THEN
                                MOVE temporary line buffer content to mvHistory[0].toLine
                        ELSE
                                MOVE mvHistory [historyCnt] .fromLine to mvHistory [historyCnt] .toLine
                        END IF
                    END WHILE LOOP
                    SET playBackFlag to FALSE
            END IF
                                          END WHILE LOOP
```

FIG. 7B

IN PLACE LINE SPLITTING PROCESS AND METHOD FOR MULTIPLE BEAM PRINTERS

FIELD OF THE INVENTION

The present invention relates to a method or process, a computer readable medium, and an image forming apparatus, and more particularly to an in place line splitting process and method for a multiple beam printer engine.

BACKGROUND OF THE INVENTION

Multi-functional peripherals (MFPs) provide a plurality of functions, such as a printer function, a scanner function, etc., (sometimes referred to herein as an image forming apparatus). Multi-functional peripherals typically include a laser imaging device as the printer function. Efforts are continually being made to increase the printing/copying speed of such devices, while at the same time maintaining quality and reducing their cost.

Laser printers are designed to produce an image on paper or other print material by placing overlapping dots at virtual positions defined by a digital raster. A raster graphic image or bitmap is generally a rectangular grid of pixels, or points of color. These virtual positions in the raster are known as "pixels", which is short for "picture elements". In laser printers, the image is typically first produced on a charged photoconductive material by scanning the photoconductor with a laser beam in a sequence of scan lines. A laser scans the surface of the photoconductive material with a laser beam in the sequence of scan lines using a rotating polygonal mirror. As a line is scanned, or written, the laser beam is energized during the extent of each pixel that corresponds to a dot in the image. When the laser beam is energized, the portion of the photoconductor upon which the laser energy impinges is discharged, thereby producing a charge-pattern copy of the desired image on the photoconductor. The printed output is obtained by attracting toner to the charge-pattern and transferring the developed image to paper or other print material.

In order to increase the operating speed of such a laser imaging device, multiple laser beams can be used to concurrently scan multiple scan lines (i.e., line splitting) that are vertically offset from one another by an incremental amount. Such an imaging device is often referred to as a multiple-beam printer engine, or dual-beam laser printer engine (i.e., two laser beams). By concurrently scanning multiple laser beams, the time required to scan the photoconductive material is decreased, which results in an increased exposure and print speed. However, by using multiple-beam printer engines, an image plane buffer is required to drive each of the laser beams. It can be appreciated that typically only lower cost printers and/or multi-functional peripherals have a dual beam design, and the corresponding on board memory system for these lower cost printers and/or multi-functional peripherals is also limited.

In conventional implementations, the various printing operations are performed by a microprocessor under the control of firmware. Depending upon the type of print data (or image) entering the apparatus and the operations necessary to process the print data, a number of firmware routines are executed to complete the print data processing operations. As printers increase in density of dot placement (dots per inch), add gray scale capability (using a set of bits per pixel to define a gray scale level), and include color printing capability (requiring additional bits per pixel over monochrome printing), the time required for the image forming apparatus to process the print data increases. For example, in color printing the memory required to store the data used to print a page can reach thirty two times or more the memory required for a monochrome printer of the same resolution. To fully utilize the printing speed capabilities of the print engine, the apparatus must have the capability to process print data sufficiently fast to supply a continuous stream of print data to the print engine, thereby allowing the print engine to continuously print throughout the print job.

In a conventional image forming apparatus, microprocessors have the versatility to be programmed to perform the operations of the data delivered, the amount of memory associated with any given microprocessor generally directly increases the speed for performing these operations. In other words, the more available memory, the better potential performance throughput. However, typically, microprocessors with more memory are more costly than those with less memory.

OBJECTS AND SUMMARY

The present invention has been made in consideration of the above issues, and provides an improved image forming apparatus and method, especially for a limited memory environment by performing in place line splitting for multiple beam or dual beam print engines.

In accordance with an exemplary embodiment, a method of rasterizing a print image plane for a multiple beam printer engine, the method comprising the steps of: receiving an image having a plurality of lines of print data for processing by a multiple beam printer engine; performing a print image plane rasterizing for each of the plurality of lines of the image by performing the steps of: (a) calculating a first line destination for a first line of print data; (b) moving the first line of print data to the first line destination; and (c) calculating a displaced line destination for a displaced line of print data caused by the movement of the first line of print data to the first line destination, and wherein if, the first line destination is not the first line of print data, continually moving the displaced line of print data to the displaced line destination until the displaced line of print data is moved to the first line, and forms a loop; and repeating steps (a)-(c) by moving to the next line which has not been moved, and which becomes the first line of a subsequent loop, and continuing until each line of the plurality of lines of print data has been moved to the first line destination or the displaced line destination associated with each line of print data of the image.

In accordance with another exemplary embodiment, an image forming apparatus comprises: a memory unit, the memory unit having a firmware application which performs in place line shifting comprising the following steps: receiving an image having a plurality of lines of print data for processing by a multiple beam printer engine; performing a print image plane rasterizing for each of the plurality of lines of the image by performing the steps of: (a) calculating a first line destination for a first line of print data; (b) moving the first line of print data to the first line destination; and (c) calculating a displaced line destination for a displaced line of print data caused by the movement of the first line of print data to the first line destination, and wherein if, the first line destination is not the first line of print data, continually moving the displaced line of print data to the displaced line destination until the displaced line of print data is moved to the first line, and forms a loop; and repeating steps (a)-(c) by moving to the next line which has not been moved, and which becomes the first line of a subsequent loop, and continuing until each line of the plurality of lines of print data has been moved to the first line destination or the displaced line destination associated with each line of print data of the image; and a multiple beam image printer engine which prints at least a portion of the image.

In accordance with a further exemplary embodiment, a computer readable medium containing a computer program for rasterizing a print image plane for a multiple beam printer engine, wherein the computer program comprises computer executable instructions for: receiving an image having a plurality of lines of print data for processing by a multiple beam printer engine; performing a print image plane rasterizing for each of the plurality of lines of the image by performing the steps of: (a) calculating a first line destination for a first line of print data; (b) moving the first line of print data to the first line destination; and (c) calculating a displaced line destination for a displaced line of print data caused by the movement of the first line of print data to the first line destination, and wherein if, the first line destination is not the first line of print data, continually moving the displaced line of print data to the displaced line destination until the displaced line of print data is moved to the first line, and forms a loop; and repeating steps (a)-(c) by moving to the next line which has not been moved, and which becomes the first line of a subsequent loop, and continuing until each line of the plurality of lines of print data has been moved to the first line destination or the displaced line destination associated with each line of print data of the image.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIGS. 3A-3D are illustrations of rasterizing a print image for a multiple beam printer engine in accordance with an exemplary embodiment.

FIG. 4 is an illustration of a process of rasterizing a print image for a multiple beam printer engine using a co-processor in accordance with an exemplary embodiment.

FIG. 5 is an illustration of a process of rasterizing a print image for a multiple beam printer engine in accordance with another exemplary embodiment.

FIG. 6 is an illustration of the pseudo code for rasterizing a print image for a multiple beam printer engine using a co-processor in accordance with an exemplary embodiment as shown in FIG. 4.

FIGS. 7A and 7B are an illustration of the pseudo code for rasterizing a print image for a multiple beam printer engine in accordance with another exemplary embodiment as show in FIG. 5.

DESCRIPTION OF THE PREFERRED EMBODIMENTS

Figure 1:
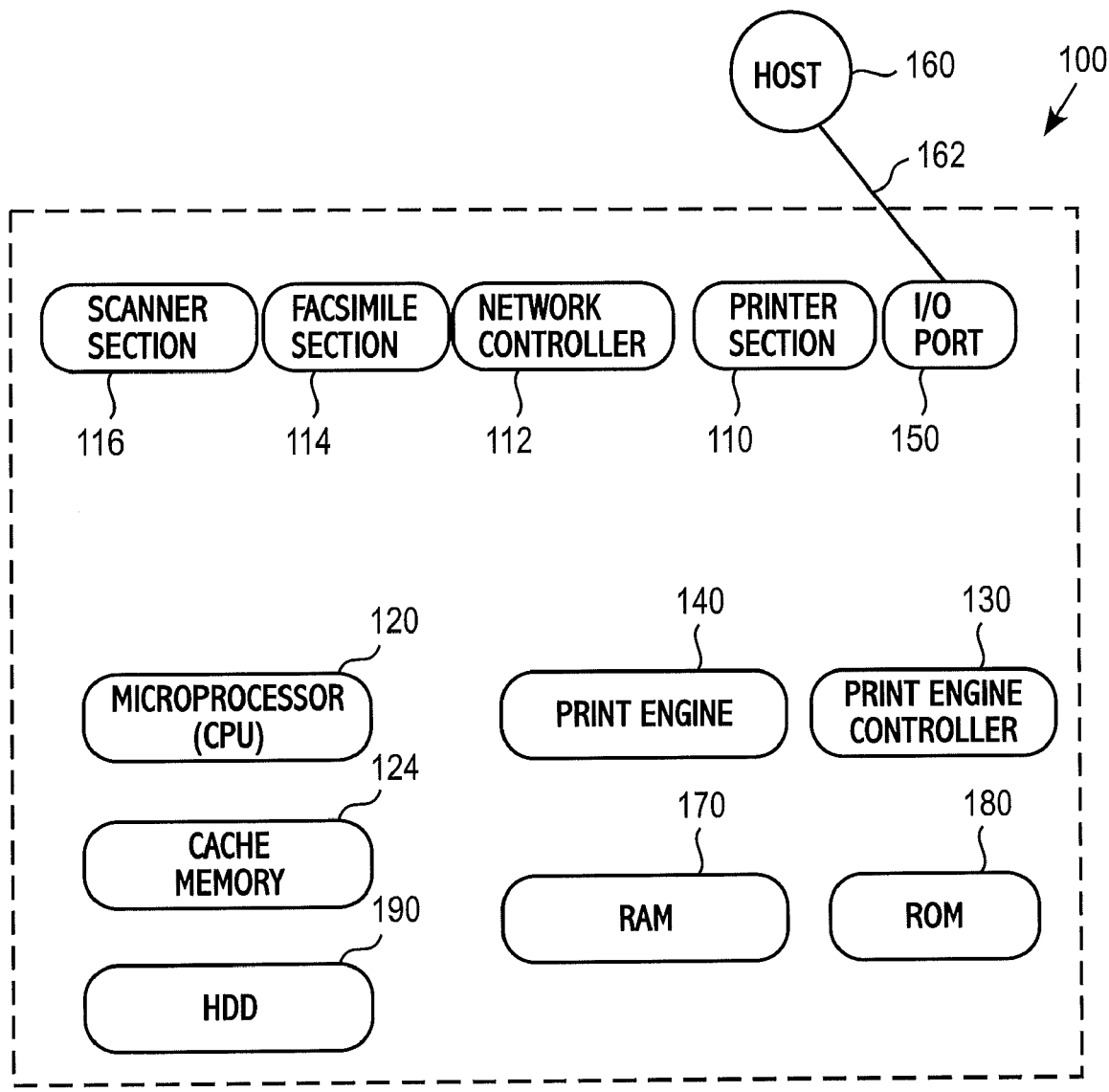
FIG. 1 is a block diagram showing the configuration of an image forming apparatus having a multiple beam printer engine in accordance with an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram showing the configuration of an image forming apparatus 100 for a multi-beam (or multiple beam) laser printer engine 140 in accordance with an exemplary embodiment of the present invention. In accordance with an exemplary embodiment, the image forming apparatus 100 is configured as a multi-functional peripheral (MFP) that has, a scanner section 116 for optically reading a document, a copying section 118 for forming and printing out the corresponding image obtained by the reading onto a sheet, a printing section 110 for converting print data inputted from outside to image data and forming and printing out the converted image onto a sheet, a facsimile section 114 for facsimile receiving and transmitting image data to and from external apparatuses through public lines.

In accordance with an exemplary embodiment, the printer engine 140 is controlled by a microprocessor 120, which communicates with other elements of the system via bus (not shown). The microprocessor 120 includes cache memory 124. A print engine controller (or printer controller) 130 and associated print engine 140 connect to bus and provides the print output capability for the print section 110. In accordance with an exemplary embodiment, the printer engine 140 is a laser printer that employs an electrophotographic drum imaging system, as known in the art. However, as will be obvious to those of ordinary skill in the art, the present invention is similarly applicable to other types of laser printers and/or imaging devices.

An input/output (110) port 150 provides communications between the print section 110 and a client device (or host) 160 and receives page descriptions (or raster data) from the host 160 for processing within the page printer. A random access memory (RAM) 170 provides a main memory for the print section 110 for storing and processing a print job data stream received from the client device or host computer 160. A read only memory (ROM) 180 holds firmware which controls the operation of microprocessor 120 and printer engine 140. Here, the firmware is built in software in the image forming apparatus 100 for executing basic controls of various hardware of the image forming apparatus 100. Code procedures stored in memory (ROM) 180 include, for example, a page converter, rasterizer, compression code, page print scheduler and print image manager. The page converter firmware converts a page description (or image) received from the host to a display command list, with each display command defining an object to be printed on the page. The rasterizer firmware converts each display command to an appropriate bit map (rasterized strip or band) and distributes the bit map into memory (RAM) 170. The compression firmware compresses the rasterized strips in the event insufficient memory exists in memory (RAM) 170 for holding the rasterized strips.

In accordance with an exemplary embodiment, the operation of printer section 110 commences when it receives a page description from host (or host device) 160 via I/O port 150 in the form of a print job data stream. The page description is placed in RAM 170 and/or cache 124. Microprocessor 120 accesses the page description, line by line, and builds a display command list using the page converter firmware in RAM 170. As the display command list is being produced, the display commands are sorted by location on the page and allocated to page strips in memory 170. When a page is closed for processing (i.e., all strips have been evaluated, rasterized, compressed, etc. for processing by printer engine 140) then the rasterized strips are passed to printer engine 140 by print engine controller 130, thereby enabling the generation of an image (i.e., text/graphics etc). The page print scheduler controls the sequencing and transferring of page strips to print engine controller 130. The print engine manager controls the operation of print engine controller 130 and, in turn, printer engine 140.

ROM 180 also includes other image processing procedures for generating an image from a print job data stream, including for example, a color space conversion procedure, halftoning, clipping, scaling, and rotating procedures to name a few. Together, these procedures make up the image processing pipeline or "image processor" for printer section 110. Each image forming processing procedure is referred herein as a "stage" in the image processing pipeline for acting upon print image data. Thus, a multi-stage image processor is employed whereby sequential image processing may occur.

In accordance with an exemplary embodiment, the image forming apparatus 110 in the form of a multi-functional peripheral preferably also includes a network controller 112, which connects to a network such as LAN (Local Area Network) via the I/O port 150 and has a function to develop print data constituted by character codes received from a client device (or host) and/or other means to image data. The facsimile section 114 connects to a public line (not shown) and has a function to compress and expand the image data with the compression mode complying with facsimile, and a function to control various communication protocols for sending and receiving facsimile through the public line.

The scanner section 116 carries out a function to read a document and obtain the image data and comprises a light source for irradiate the document, a CCD (Charge Coupled Device) image sensor for reading the document by one line in a width direction, and an A/D converter for converting analogue image signal outputted by the image sensor to digital image data. Although not shown in the drawing, the scanner section 116 further comprises a moving mechanism for moving the reading position per one line of the image sensor in a longitudinal direction of the document and optical parts comprising a lens and a mirror for guiding the reflected light from the document and focusing image on the image sensor. The network controller 112, the facsimile section 114 and the scanner section 116 function as input sections of the image data.

A hard disk device 190 carries out a function for storing an Operating System (OS) which controls operations of the image forming apparatus 100, application software which works on the OS and so on, and a function for memorizing and storing various data including image data. In accordance with an embodiment, the OS stored in the hard disk device 190 is an embedded OS which supports a file system. The RAM 170 carries out the function for temporarily holding the data to be memorized in the hard disk device 190.

The printer section 110 carries out a function for forming and outputting an image corresponding to the image data onto the recording sheet using an electro-photographic process. The printer section 110 is configured as a so-called laser printer having a recording sheet conveying device (not shown in the drawing), a photoreceptor drum, a charging unit, an LD (Laser Diode) being modulated lighting corresponding to the image data inputted, a scanning unit for scanning the laser light irradiated from the LD on the photoreceptor drum, a developing unit, a transfer and separation unit, a cleaning unit, and a fixing unit. In accordance with another embodiment, the printer engine 140 can be an LED printer for irradiating onto the photoreceptor drum by LED (Light Emitting Diode) in place of laser light or other types of printer.

As shown in FIG. 1, the image forming apparatus (or printer) 100 and the client device (or host) 160 are connected to each other via a network 162 (e.g., LAN or WAN). In accordance with an exemplary embodiment, the image forming apparatus 100 receives a print job from the client device 160, which is then printed onto at least one sheet of paper and/or other printable medium. Examples of the network 162 consistent with embodiments of the invention include, but are not limited to, the Internet, an intranet, a local area network (LAN) and a wide area network (WAN). The image forming apparatus 100 and the client device 160 can be connected with a wire or be connected with wireless by using radio frequency (RF) and/or infrared (IR) transmission. Examples of image forming apparatuses 100 consistent with exemplary embodiments of the invention include, but are not limited to, a laser beam printer (LBP), an LED printer, a multi-functional laser beam printer including copy function (MFP). In accordance with an exemplary embodiment, the image forming apparatus 100 is preferably a color printer or a black and white (B/W) printer.

Figure 2:
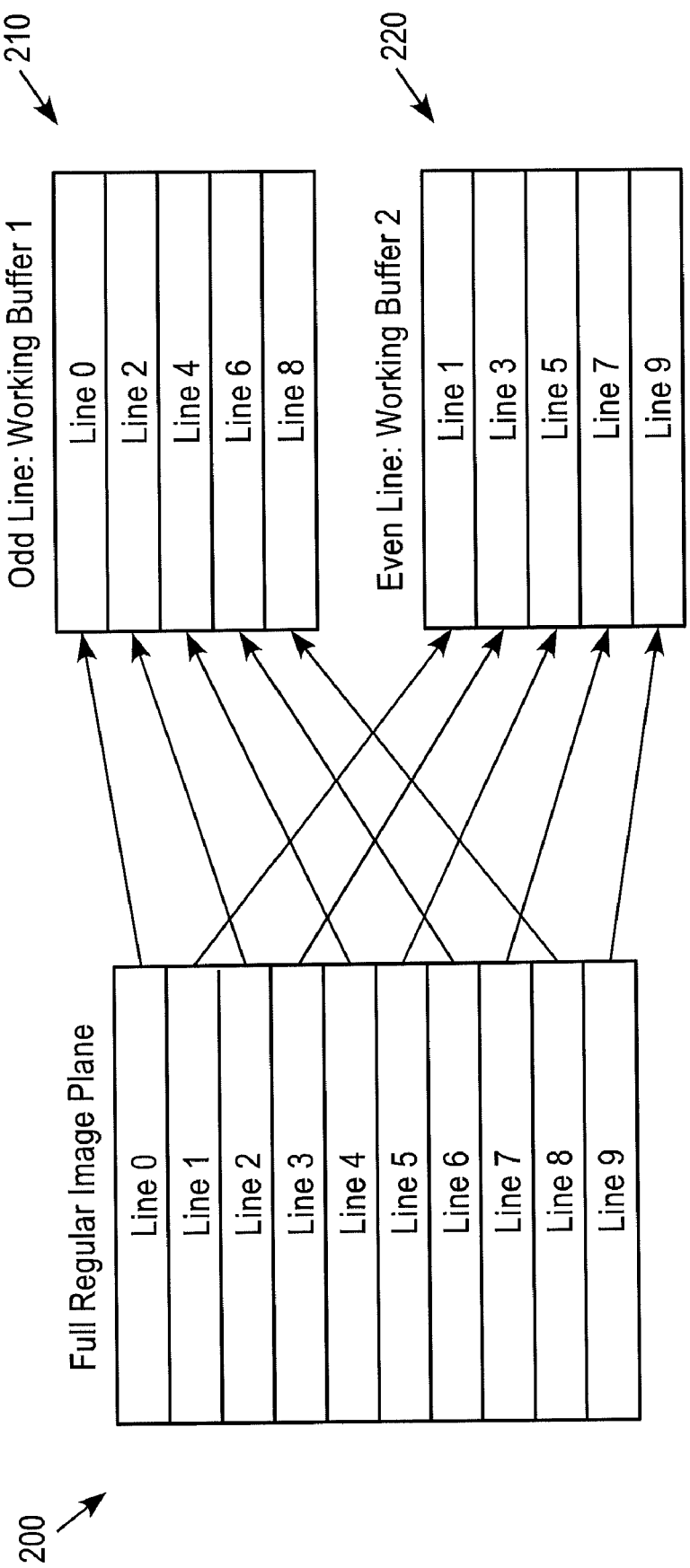
FIG. 2 is a diagram showing a working buffer for a dual-beam printer engine.

FIG. 2 is a diagram showing a working buffer for a typical dual-beam printer engine. For a multi-beam printer engine (e.g., a dual-beam printer engine), the full regular image plane 200 requires at least two (2) image plane buffers (or working buffers) to drive each of the laser beams of the image forming apparatus 100. Accordingly, as shown in FIG. 2, one image buffer 210 contains all the odd lines of print data of the original image plane while the other image buffer 220 contains all the even lines of print data. It can be appreciated that since the print image plane rasterizing step usually produces regular single plane images, an odd/even line splitting step is necessary.

For example, for an original print image on an 8.5 inch by 11 inch sheet of paper, the original print image can include 5120 (vertical lines) by 6600 (horizontal lines) lines, and can occupy almost 4 megabytes of digital information storage. Accordingly, for an odd/even line split, an additional 4 megabytes of memory is needed for a black and white image. Meanwhile, if the print engine is a color print engine, which uses a CMYK color model (cyan, magenta, yellow, and black), also referred to as process color or four color, the original print image can require an additional 16 megabytes of digital storage (or 32 megabytes of digital storage in total). Thus, by increasing the required memory, the performance of the image forming apparatus is affected.

In accordance with an exemplary embodiment as shown in FIGS. 3A-3D, a process of rasterizing a print image for a multiple beam printer engine is disclosed. It can be appreciated that in accordance with an exemplary embodiment, the method and systems are based on following principles: (1) each single line of print data has its unique destination location; and (2) each single line of print data only needs to be moved once to its destination location.

In accordance with an exemplary embodiment as shown in FIGS. 3A-3D, the method or process starts from the first line of print data, which in most print image plane rasterizing steps or rasterization, will remain as the first line and no movement of the first line of print data is necessary. However, it can be appreciated that if the print image rasterizing step or rasterization requires the first line of print data to be moved, the process will begin on the first line as set forth below. If, the first line does not need to be moved within the print image rasterization, the process starts from the second line (i.e., fromLine), and a destination location (toLine) is calculated. As described herein, the "fromLine" is the line from which the print data is moved. Meanwhile, the "toLine" is the line in which the print data is moved to. Once the destination location (or toLine) is calculated, the print data from the fromLine is then moved to the toLine. Once the toLine has been pushed out (or moved) and saved into a local memory (i.e., a DSP Local memory), the print data from the toLine which has just been pushed out (i.e., the next fromLine) is moved to its destination location. Each line is continually pushed out (or moved) until the print data on each line has been moved to its destination location according to a desired rasterization (or print image rasterizing scheme). This continued pushing or moving of print data from each line eventually forms a loop. Once a loop is detected, the method finds the next line which has not yet been moved and the process starts again. The process repeats continually until the print data from each and every line has been moved to its destination location. It can be appreciated that in accordance with an exemplary embodiment, the whole process is completed (or finished) once the move count is equal to the total line number.

Figure 3A:
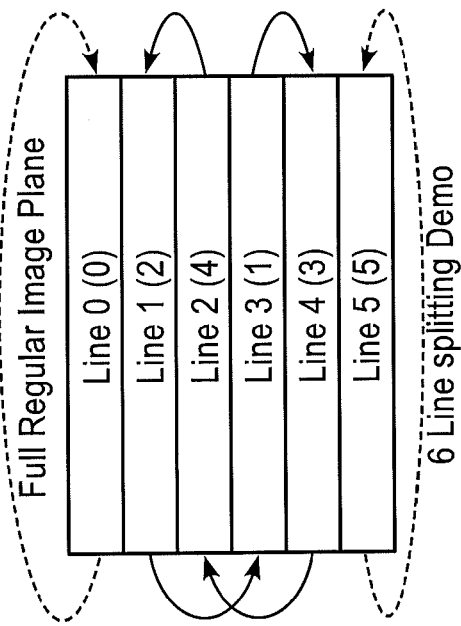

In FIG. 3A, a 6 line case or example is shown wherein the print image rasterizing scheme or rasterization requires an odd/even line split. As shown in FIG. 3A, in a 6 line example, the first line, line 00 (i.e., even) remains as the first line (i.e., no operation) and a first loop is detected. The process moves to the next line, line 01 (i.e., odd), which is moved to line 03; line 03 is moved to line 04; line 04 is moved to line 02; and line 02 is moved to line 01, wherein another loop is detected. The process moves to the next pending line, line 05 which remains as line 05 (i.e., no operation).

Figure 3B:
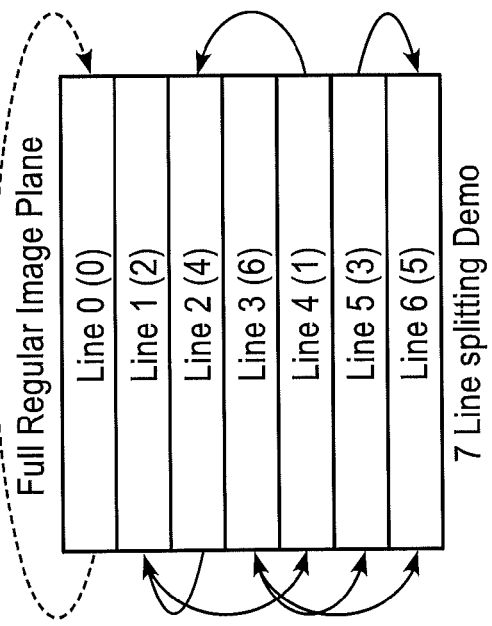

In FIG. 3B, a 7 line example is shown wherein the print image rasterizing scheme or rasterization also requires an odd/even line split. As shown in FIG. 3B, in a 7 line example, the first line, line 00 remains as the first line (i.e., no operation) and a first loop is detected. The process moves to the next line, line 01, which is moved to line 04; line 04 is moved to line 02; and line 02 is moved to line 01, wherein a second loop is detected. The process moves to the next pending line, line 03, which is moved to line 05; line 05 is moved to line 06, and line 06 is moved to line 03, wherein another loop is detected.

In FIG. 3C, an 8 line example is shown wherein the print image rasterizing scheme or rasterization also requires an odd/even line split. As shown in FIG. 3C, in an 8 line example, the first line, line 00 remains as the first line (i.e., no operation) and a first loop is detected. The process then moves to the next line, line 01, which is moved to line 04; line 04 is moved to line 02; and line 02 is moved to line 01, wherein a second loop is detected. Line 03 is then moved to line 05; line 05 is moved to line 06; and line 06 is moved to line 03, wherein another loop is detected. The process moves to the next pending line, line 07 which remains as line 07 (i.e., no operation).

In FIG. 3D, a 10 line example is shown wherein the print image rasterizing scheme or rasterization also requires an odd/even line split. As shown in FIG. 3D, in a 10 line example, the first line, line 00 remains as the first line (i.e., no operation) and a first loop is detected. The process moves to the next line, line 01, which is moved to line 05; line 05 is moved to line 07; line 07 is moved to line 08; line 08 is moved to line 04; line 04 is moved to line 02; and line 02 is moved to line 01, wherein a loop is detected and the process moved to the next pending line. Line 03 is moved to line 06; and line 06 is moved to line 03, wherein another loop is detected. The process moves to the next pending line, line 09 which remains as line 09 (i.e., no operation).

In accordance with an exemplary embodiment as shown in FIG. 4, a co-processor (e.g., a DSP) 420 located on the printer controller board 400 can be used to achieve the line splitting in place (i.e., no extra working buffer is required). As shown in FIG. 4, the printer controller board 400 includes a system memory 410 and a co-processor (or DSP) 420. In accordance with an exemplary embodiment, the co-processor or DSP processor 420 is preferably a 32K super-high-speed internal memory processor, which uses DMA (direct memory access) to exchange (read/write) data between system RAM and the processor's internal memory. As shown in FIG. 4, the Source Line (before move) 412 is temporarily moved into a temporary single line buffer 422 within the co-processor 420, and then the Source Line 412 is moved into the destination line 414. As described above, the process continues until a loop is detected and the process begins again with the next line, which has not been moved. In accordance with an exemplary embodiment, a flag memory buffer 430 can be used to store data related to whether each line has been moved to the corresponding destination line 414 or not.

It can be appreciated that in some cases or applications, a co-processor (or DSP processor) won't be available for the printer controller board. Thus, in accordance with an exemplary embodiment as shown in FIG. 5, a CPU based approach can be used, wherein the process within the printer circuit board 500 requires that before each single line 502 can be pushed out of its location 510, its content will be saved to a temporary line buffer 530, and then the temporary line buffer (which contains the line of interest) will be moved to its destination location 520 (which will push out the next line). It can be appreciated that without the help of a co-processor or DSP, the temporary line buffer 530 is located within the system memory, which will create memory traffic as shown in FIG. 5.

The process or method as shown in FIG. 5, is the same as described for the in place DSP line splitting process or method for a dual-beam or multi-beam printer as shown in FIGS. 2-4, but is modified so that the memory traffic is minimized. It can be appreciated that one of the reasons that the toLine (or displaced line) is saved to a temporary buffer is because the process or method does not know where to move the toLine (or displaced line) in the original process or method. However, right after the next iteration, the toLine (or displaced line) is known. Accordingly, it can be appreciated that in accordance with an exemplary embodiment, the process or method is modified such that each of the toLine (displaced line destination) moves (or steps) are configured in advance and the sequence information (or history) is saved until a line move loop is detected. Once a line move loop is detected, the process or method knows exactly how all the lines in the corresponding loop will be moved so that the process or method can playback the moves within each loop without moving each and every line into a temporary buffer. In accordance with an exemplary embodiment, during playback, only the first line in the loop is saved to a temporary buffer, and the playback of the loop is performed in the reverse order so that each and every line (i.e., displaced line destination) in the loop is moved to its destination location (or destination), so the next move occurs directly between line locations.

In accordance with another exemplary embodiment, it can be appreciated that once each of the moves (or sequences of moves) within each loop is determined, the playback or movement of each of the lines to their destination location can be performed by selecting a line within the loop and moving each and every one of the lines in reverse order so that the last move is into the displaced line of the line selected within the loop and temporarily saved in a temporary buffer. It can be appreciated that as set forth above, the playback of the loop is in the reverse order so that each and every line in the loop has already been moved to its destination location, so the next move occurs directly between line locations without a temporary buffer.

FIGS. 6, 7A and 7B are illustrations of the pseudo code for a method of performing a print image plan rasterizing for a multiple beam laser printer enginer using a co-processor (or DSP) in accordance with a modified exemplary embodiment as shown in FIG. 4, and for a method of performing a print image plane rasterizing for a multiple beam laster printer engine in accordance with another modified exemplary embodiment as shown in FIG. 5, respectively. As shown in FIGS. 6, 7A and 7B, thepseudo code begins with odd lines being stored from the beginning and the even lines being stored from the middle, rather than the even lines from the beginning and the odd lines in the middle as shown in FIGS. 3A-3D.

In accordance with another exemplary embodiment, a computer readable medium is disclosed containing a computer program for rasterizing a print image plane for a multiple beam printer engine, wherein the computer program comprises computer executable instructions for: receiving an image having a plurality of lines of print data for processing by a multiple beam printer engine; performing a print image plane rasterizing for each of the plurality of lines of the image by performing the steps of: (a) calculating a first line destination for a first line of print data; (b) moving the first line of print data to the first line destination; and (c) calculating a displaced line destination for a displaced line of print data caused by the movement of the first line of print data to the first line destination, and wherein if, the first line destination is not the first line of print data, continually moving the displaced line of print data to the displaced line destination until the displaced line of print data is moved to the first line, and forms a loop; and repeating steps (a)-(c) by moving to the next line which has not been moved, and which becomes the first line of a subsequent loop, and continuing until each line of the plurality of lines of print data has been moved to the first line destination or the displaced line destination associated with each line of print data of the image.

It can be appreciated that the process and method can be introduced into the apparatus by updating the firmware in the non-volatile memory of the image forming apparatus. In this regard, the method may be brought to the apparatus in a form of a package of install software and the firmware, which may be divided and/or compressed so that the install software effectively installs the firmware. The package may be steadily stored in a computer readable diskette, such as a compact disk, or may be transmitted through a wire/wireless communication line.

The method described above can be used to print on paper or other suitable printing medium such as thin plastic sheets, etc. The computer readable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if embodiment of the present invention is combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of rasterizing a print image plane for a multiple beam printer engine, the method comprising the steps of:
   receiving an image having a plurality of lines of print data for processing by a multiple beam printer engine;
   performing a print image plane rasterizing for each of the plurality of lines of the image in a single print image buffer by performing the steps of:
   (a) calculating a first line destination for a first line of print data;
   (b) moving the first line of print data to the first line destination; and
   (c) calculating a displaced line destination for a displaced line of print data caused by the movement of the first line of print data to the first line destination, and wherein if, the first line destination is not the first line of print data, continually moving the displaced line of print data to the displaced line destination until the displaced line of print data is moved to the first line, and forms a loop; and
   repeating steps (a)-(c) by moving to the next line which has not been moved, and which becomes the first line of a subsequent loop, and continuing until each line of the plurality of lines of print data has been moved to the first line destination or the displaced line destination associated with each line of print data of the image.

2. The method of claim 1, further comprising saving the displaced line of print data in a temporary single line buffer until the displaced line of print data has been moved to the displaced line destination.

3. The method of claim 1, further comprising flagging each of the lines using a flag memory buffer, and wherein the flag memory buffer stores data related to each line of the image and whether each line has been moved to a corresponding displaced line destination.

4. The method of claim 3, further comprising scanning the flag memory buffer for unmoved lines of print data within the plurality of lines.

5. The method of claim 1, wherein each line of the image has a unique destination and each line is moved only once.

6. The method of claim 1, further comprising saving the content of the displaced line of print data before moving the first line of print data into the first line destination.

7. The method of claim 6, further comprising saving the content of a next displaced line of print data before moving a previous displaced line of print data into the displaced line destination.

8. The method of claim 1, wherein the print image plane rasterizing step comprises performing an odd line and an even line split of the plurality of lines of print data.

9. The method of claim 1, further comprising printing at least one page of the image with the multiple beam printer engine.

10. The method of claim 1, wherein the multiple beam printer engine is part of a multi-functional printer.

11. The method of claim 1, wherein the step of saving a displaced line of print data occupying the original line destination further comprises saving each displaced line of print data to a temporary line buffer until the displaced line of print data is moved to the displaced line destination, and wherein the temporary line buffer is a co-processor.

12. The method of claim 1, wherein the image is received from a host device.

13. The method of claim 1, wherein multiple beam printer engine is a multiple beam laser printer engine.

14. A method of rasterizing a print image plane for a multiple beam printer engine, the method comprising the steps of:
   receiving an image having a plurality of lines of print data for processing by a multiple beam printer engine;
   performing a print image plane rasterizing for each of the plurality of lines of the image by performing the steps of:
      (a) calculating a first line destination for a first line of print data;
      (b) moving the first line of print data to the first line destination; and
      (c) calculating a displaced line destination for a displaced line of print data caused by the movement of the first line of print data to the first line destination, and wherein if, the first line destination is not the first line of print data, continually moving the displaced line of print data to the displaced line destination until the displaced line of print data is moved to the first line, and forms a loop;
   repeating steps (a)-(c) by moving to the next line which has not been moved, and which becomes the first line of a subsequent loop, and continuing until each line of the plurality of lines of print data has been moved to the first line destination or the displaced line destination associated with each line of print data of the image;
   generating a move sequence according to steps (a)-(c) without moving any of the plurality of lines; and
   playing back the move sequence by performing the following steps:
      displacing and saving a displaced line of print data in the move sequence in a temporary buffer for each loop;
      filing each loop in reverse order by moving each and every line in the loop which has already been moved to a displaced destination location, so that a next move occurs directly between line locations without the need for the temporary buffer; and
      moving the displaced line of print data from the temporary buffer to the displaced line destination.

15. An image forming apparatus comprising:
   a memory unit, the memory unit having a firmware application which performs in place line shifting comprising the following steps:
      receiving an image having a plurality of lines of print data for processing by a multiple beam printer engine;
      performing a print image plane rasterizing for each of the plurality of lines of the image in a single print image buffer by performing the steps of:
         (a) calculating a first line destination for a first line of print data;
         (b) moving the first line of print data to the first line destination; and
         (c) calculating a displaced line destination for a displaced line of print data caused by the movement of the first line of print data to the first line destination, and wherein if, the first line destination is not the first line of print data, continually moving the displaced line of print data to the displaced line destination until the displaced line of print data is moved to the first line, and forms a loop; and
      repeating steps (a)-(c) by moving to the next line which has not been moved, and which becomes the first line of a subsequent loop, and continuing until each line of the plurality of lines of print data has been moved to the first line destination or the displaced line destination associated with each line of print data of the image; and
   a multiple beam image printer engine which prints at least a portion of the image.

16. The image forming apparatus of claim 15, further comprising a co-processor, which saves the displaced line of print data until the displaced line of print data is moved to the displaced line destination.

17. The image forming apparatus of claim 15, wherein the multiple beam printer engine is a laser printer engine.

18. The image forming apparatus of claim 15, wherein the multiple beam printer engine is a color laser printer engine.

19. An image forming apparatus
   a memory unit, the memory unit having a firmware application which performs in place line shifting comprising the following steps:
      receiving an image having a plurality of lines of print data for processing by a multiple beam printer engine;
      performing a print image plane rasterizinq for each of the plurality of lines of the image by performing the steps of:
         (a) calculating a first line destination for a first line of print data;
         (b) moving the first line of print data to the first line destination; and
         (c) calculating a displaced line destination for a displaced line of print data caused by the movement of the first line of print data to the first line destination, and wherein if, the first line destination is not the first line of print data, continually moving the displaced line of print data to the displaced line destination until the displaced line of print data is moved to the first line, and forms a loop; and
      repeating steps (a)-(c) by moving to the next line which has not been moved, and which becomes the first line of a subsequent loop, and continuing until each line of the plurality of lines of print data has been moved to the first line destination or the displaced line destination associated with each line of print data of the image; and
      generating a move sequence according to steps (a)-(c) without moving any of the plurality of lines; and
      playing back the move sequence by performing the following steps:
         displacing and saving a displaced line of print data in the move sequence in a temporary buffer for each loop;
         filing each loop in reverse order by moving each and every line in the loop which has already been moved to a displaced destination location, so that a next move can happen directly between line locations without the need for the temporary buffer; and
         moving the displaced line of print data from the temporary buffer to the displaced line destination; and
   a multiple beam image printer engine which prints at least a portion of the image.

20. A non-transitory computer readable medium containing a computer program for rasterizing a print image plane for a multiple beam printer engine, wherein the computer program comprises computer executable instructions for:
   receiving an image having a plurality of lines of print data for processing by a multiple beam printer engine;
   performing a print image plane rasterizing for each of the plurality of lines of the image in a single print image buffer by performing the steps of:
      (a) calculating a first line destination for a first line of print data;
      (b) moving the first line of print data to the first line destination; and (c) calculating a displaced line destination for a displaced line of print data caused by the movement of the first line of print data to the first line destination, and wherein if, the first line destination is not the first line of print data, continually moving the displaced line of print data to the displaced line destination until the displaced line of print data is moved to the first line, and forms a loop; and repeating steps (a)-(c) by moving to the next line which has not been moved, and which becomes the first line of a subsequent loop, and continuing until each line of the plurality of lines of print data has been moved to the first line destination or the displaced line destination associated with each line of print data of the image.

* * * * *